(12) United States Patent
Tang et al.

(10) Patent No.: US 8,443,151 B2
(45) Date of Patent: May 14, 2013

(54) PREFETCH OPTIMIZATION IN SHARED RESOURCE MULTI-CORE SYSTEMS

(75) Inventors: Puqi P. Tang, Portland, OR (US); Hemant G. Rotithor, Hillsboro, OR (US); Ryan L. Carlson, Hillsboro, OR (US); Nagi Aboulenein, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 675 days.

(21) Appl. No.: 12/614,619

(22) Filed: Nov. 9, 2009

(65) Prior Publication Data

US 2011/0113199 A1 May 12, 2011

(51) Int. Cl.
  *G06F 12/00* (2006.01)
  *G06F 12/08* (2006.01)
(52) U.S. Cl.
  USPC ............ 711/137; 711/143; 711/E12.001; 711/E12.057; 712/207
(58) Field of Classification Search .................. None
  See application file for complete search history.

(56) References Cited

U.S. PATENT DOCUMENTS

| | | | |
|---|---|---|---|
| 6,996,639 B2 | 2/2006 | Narad | |
| 7,340,550 B2 | 3/2008 | Howard et al. | |
| 2004/0022094 A1 | 2/2004 | Radhakrishnan | |
| 2004/0123043 A1* | 6/2004 | Rotithor et al. | 711/137 |
| 2007/0005903 A1 | 1/2007 | Lau et al. | |
| 2007/0094453 A1 | 4/2007 | Santhanakrishnan et al. | |
| 2007/0204267 A1 | 8/2007 | Cole et al. | |
| 2007/0239940 A1 | 10/2007 | Doshi et al. | |
| 2008/0155196 A1* | 6/2008 | Black et al. | 711/119 |
| 2009/0019229 A1* | 1/2009 | Morrow et al. | 711/137 |
| 2009/0150622 A1* | 6/2009 | Allen et al. | 711/154 |

OTHER PUBLICATIONS

Srinath, et al., "Feed back Directed Prefetching: Improving the performance and Bandwidth-Efficiency of Hardware Prefetchers," Feb. 2007, IEEE, pp. 63-74.*
United States Patent Application, pending—not yet published, U.S. Appl. No. 10/335,439, filed Dec. 30, 2002, to Distefano et al.

* cited by examiner

*Primary Examiner* — Michael Krofcheck
(74) *Attorney, Agent, or Firm* — David P. McAbee

(57) ABSTRACT

An apparatus and method is described herein for optimization to prefetch throttling, which potentially enhances performance, reduces power consumption, and maintains positive gain for workloads that benefit from prefetching. More specifically, the optimizations described herein allow for bandwidth congestion and prefetch accuracy to be taken into account as feedbacks for throttling at the source of prefetch generation. As a result, when there is low congestion, full prefetch generation is allowed, even if the prefetch is inaccurate, since there is available bandwidth. However, when congestion is high, the determination of throttling falls to prefetch accuracy. If accuracy is high—miss rate is low—then less throttling is needed, because the prefetches are being utilized—performance is being enhanced. Yet, if prefetch accuracy is low—miss rate is high—then more prefetch throttling is needed to save power, because the prefetch are not being utilized—performance is not being enhanced by the large number of prefetches.

38 Claims, 5 Drawing Sheets

PREFETCH OPTIMIZATION IN SHARED
RESOURCE MULTI-CORE SYSTEMS

FIELD

This invention relates to the field of processor execution and, in particular, to optimizing prefetching in a processor.

BACKGROUND

Advances in semi-conductor processing and logic design have permitted an increase in the amount of logic that may be present on integrated circuit devices. As a result, computer system configurations have evolved from a single or multiple integrated circuits in a system to multiple cores, multiple hardware threads, and multiple logical processors present on individual integrated circuits. A processor or integrated circuit typically comprises a single physical processor die, where the processor die may include any number of cores, hardware threads, or logical processors.

The ever increasing number of processing elements—cores, hardware threads, and logical processors—on integrated circuits enables more tasks to be accomplished in parallel. In addition, to keep the multiple processing elements busy and to optimize execution, new techniques have been created, such as prefetching. Prefetching of data often provides high performance for many workloads once patterns are identified and data is prefetched before it's demanded by the program, because accesses to cache hierarchies are typically lower latency the closer the cache gets to execution units.

However, prefetch generation for multiple processing elements is complex due to a number of considerations. First, processing elements may run different types of workloads; some of which may benefit from prefetching and others that may not. Second, prefetches from multiple processing elements may compete for space in shared caches, which may also displace important, key data to be utilized by other processing elements. Third, a processing element should highly utilize memory bandwidth, while not generating inefficient prefetches.

As an example, when excess, inefficient prefetches are generated by multiple processing elements, different interconnect bandwidth, such as memory interconnect bandwidth, becomes saturated. Furthermore, the excess prefetches potentially pollute the cache memory, which can lead to loss of performance and wasted power in comparison to a more accurate number of generated prefetches. These limitations become more acute as the number of processing elements increases.

Yet, it's extremely difficult to design highly accurate prefetches. And, even if more accuracy is obtainable, prefetched data may be evicted before use. As a result, "bad prefetches" may be due to either poor address stream generation—address space inaccuracy—or because data is evicted before use—temporal inaccuracy. Unfortunately, previous prefetch throttling systems have throttled prefetches based on a direct or indirect indication of the number of prefetches within prefetch generators themselves without taking into account bandwidth congestion and prefetch accuracy.

BRIEF DESCRIPTION OF THE DRAWINGS

The present invention is illustrated by way of example and not intended to be limited by the figures of the accompanying drawings.

DETAILED DESCRIPTION

Figure 1:
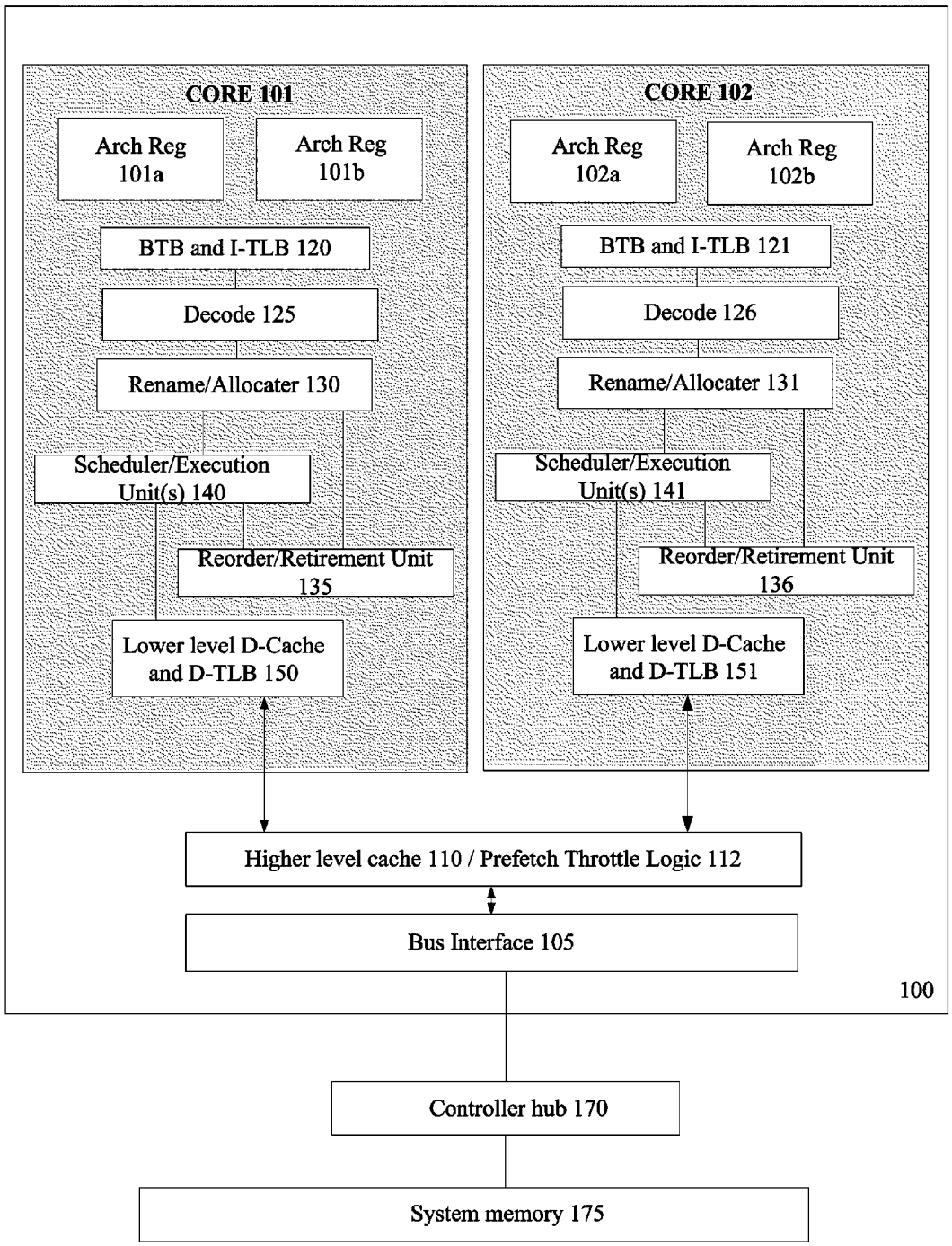
FIG. 1 illustrates an embodiment of a processor including multiple processing elements capable of executing multiple software threads concurrently and prefetch throttling logic capable of throttling prefetch generation.

In the following description, numerous specific details are set forth such as examples of specific hardware structures for prefetch generation, congestion measurement, and cache miss measurement; specific processor units/logic, specific shared and distributed cache implementations, specific examples of processing elements, specific congestion and miss rate thresholds, etc. in order to provide a thorough understanding of the present invention. It will be apparent, however, to one skilled in the art that these specific details need not be employed to practice the present invention. In other instances, well known components or methods, such as specific congestion and miss rate measurement logic, specific and alternative multi-core and multi-threaded processor architectures, specific uncore logic, specific memory controller logic, and specific operational details of microprocessors, have not been described in detail in order to avoid unnecessarily obscuring the present invention.

The method and apparatus described herein are for optimizing prefetch in a processor. Specifically, the optimizations are primarily discussed in reference to prefetch into caches associated with multiple cores of a processor. In fact, an illustrative ring organization for communication between the cores and caches is briefly described below to illustrate an embodiment of prefetching. Additionally, multiple cache organizations are discussed below for holding prefetched data; yet, a physically distributed, logically unified (PDLU) cache organization—a cache is distributed in physical slices that hold part of the cache tags and data, while a single address space is shared by multiple processing elements mapped to different parts of the cache—is primarily discussed. Discussion is focused on the PDLU organization, because it presents a few additional considerations, such as additional mechanisms for determining prefetch accuracy.

Yet, the apparatus' and methods described herein are not so limited, as they may be utilized in any cache organization, such as a physically unified, logically unified (PULU) cache organization—a cache is physically located in a single place, while a single address space is shared by multiple processing elements mapped to the cache; a physically distributed, logically distributed (PDLD) cache organization—a cache is distributed in physical slices that hold part of the cache tags and data, while multiple address spaces are distributed over the physical slices; and a physically unified, logically distributed (PULD) cache organization—a cache is physically located in a single place, while multiple address spaces are distributed over the physical slices. Note that this list of cache organizations is not exhaustive, as the methods and apparatus' described herein may be utilized with other cache organizations. Moreover, the methods and apparatus described herein may be utilized within any computer system utilizing prefetch, and are not limited to cores sharing resources or a ring configuration. For example, a plurality of on-chip processing elements may be interconnected in any manner, while utilizing the prefetching apparatus and methods described herein.

Referring to FIG. 1, an embodiment of a processor capable of executing multiple threads concurrently is illustrated. Processor 100 includes prefetch hardware to generate prefetches and prefetch throttling module 112 to throttle prefetch generation. Processor 100 includes any processor, such as a micro-processor, an embedded processor, a digital signal processor (DSP), a network processor, or other device to execute code. Processor 100, as illustrated, includes a plurality of processing elements.

In one embodiment, a processing element refers to a thread unit, a thread slot, a process unit, a context, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state wherein each independently maintained architectural state is associated with at least some dedicated execution resources. In contrast to cores, a hardware thread typically refers to any logic located on an integrated circuit capable of maintaining an independent architectural state wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores, core 101 and 102. Although processor 100 may include asymmetric cores, i.e. cores with different configurations, functional units, and/or logic, symmetric cores are illustrated. As a result, core 102, which is illustrated as identical to core 101, will not be discussed in detail to avoid repetitive discussion. In addition, core 101 includes two hardware threads 101a and 101b, while core 102 includes two hardware threads 102a and 102b. Therefore, software entities, such as an operating system, potentially view processor 100 as four separate processors, i.e. four logical processors or processing elements capable of executing four software threads concurrently.

Here, a first thread is associated with architecture state registers 101a, a second thread is associated with architecture state registers 101b, a third thread is associated with architecture state registers 102a, and a fourth thread is associated with architecture state registers 102b. As illustrated, architecture state registers 101a are replicated in architecture state registers 101b, so individual architecture states/contexts are capable of being stored for logical processor 101a and logical processor 101b. Other smaller resources, such as instruction pointers and renaming logic in rename allocator logic 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register, low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, processor 100 includes a branch target buffer 120 to predict branches to be executed/taken and an instruction-translation buffer (I-TLB) 120 to store address translation entries for instructions.

Processor 100 further includes decode module 125 is coupled to fetch unit 120 to decode fetched elements. In one embodiment, processor 100 is associated with an Instruction Set Architecture (ISA), which defines/specifies instructions executable on processor 100. Here, often machine code instructions recognized by the ISA include a portion of the instruction referred to as an opcode, which references/specifies an instruction or operation to be performed.

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

As depicted, cores 101 and 102 share access to higher-level or further-out cache 110, which is to cache recently fetched elements. Note that higher-level or further-out refers to cache levels increasing or getting further way from the execution unit(s). In one embodiment, higher-level cache 110 is a last-level data cache—last cache in the memory hierarchy on processor 100—such as a second or third level data cache. However, higher level cache 110 is not so limited, as it may be associated with or include an instruction cache. A trace cache—a type of instruction cache—instead may be coupled after decoder 125 to store recently decoded traces.

Previously, prefetch throttling was purely based on queuing state within prefetch generation queues. Yet, when bandwidth congestion is high, if prefetches continue to be generated, excess prefetches may delay normal demand requests by monopolizing already highly congested interconnects and/or memories. Therefore, in one embodiment, prefetch throttle logic 112 is to provide a prefetch throttling level based on bandwidth congestion and/or prefetch accuracy. In contrast, bandwidth congestion may be measured at point throughout the processor or computer system. For example, bandwidth congestion may be measured at the interconnect between the controller hub 170 and system memory 175—memory congestion bandwidth—or between the bus interface 105 and controller hub 170—front-side-bus bandwidth congestion. Note, in the depicted configuration that processor 100 includes bus interface module 105 to communicate with devices external to processor 100, such as system memory 175, a chipset, a northbridge, or other integrated circuit. Memory 175 may be dedicated to processor 100 or shared with other devices in a system. Common examples of types of memory 175 include dynamic random access memory (DRAM), static RAM (SRAM), non-volatile memory (NV memory), and other known storage devices.

Additionally, modern processors have started to integrate memory access logic/controllers on processor 100; this on-processor memory interface is sometimes referred to as uncore or on-processor memory controller hub. Therefore, in one embodiment, bandwidth congestion includes uncore congestion, such as uncore pipeline congestion, or congestion within a queue or other stage of an on-processor memory interface.

As an example, when congestion exceeds a high threshold, throttle logic starts to throttle pre-fetches, such as throttling the source of pre-fetch generation within a core. In an additional embodiment, the throttling level is dependent on prefetching accuracy. Here, even if there is a high-level of congestion, prefetch throttling may not be ideal, if the prefetches are accurate—highly efficient prefetching. In other words, if the data that is being prefetched is being hit within a cache, such as cache 110, no throttling is needed because the high number of prefetches are being utilized; the behavior prefetch designers are hoping for during processor operation. Alternatively, if there is high congestion and the prefetch accuracy is low—low efficiency prefetching—then prefetch throttling is more appropriate. In this case, there are, once again, a higher number of prefetches, but they're not being hit. As a result, the extraneous prefetches that aren't being utilized take up space in cache 110, potentially dislodge other core's data, and take extra power to generate. One example of prefetch accuracy is a miss rate to cache 110. However, both congestion and prefetch accuracy may be determined utilizing any known method.

In one embodiment, finer grain throttling is provided through multiple levels of congestion, and in conjunction, multiple levels of prefetch accuracy. For example, when congestion is below a low threshold value, no prefetch throttling is provided. When the congestion is between the low and the high threshold, the previously provided throttling level is maintained. And, when the congestion is above a high threshold, the throttling level is determined based on the throttling efficiency. A more detailed illustration of these levels is discussed in detail with reference to FIG. 4 below.

FIG. 1 illustrates an abstracted, logical view of an exemplary processor with a representation of physically unified caches, such as physically unified, shared last-level cache (LLC) 110. However, the methods and apparatus described herein are not so limited, as they may be implemented in any level cache memory that is physically unified or distributed, logically unified or distributed, as well as any combination thereof. A physically unified, logically unified (PULU)—a physically and logically centralized cache memory—is the most straightforward case. For example, to measure prefetch accuracy with a PULU organization, prefetch accuracy logic associated with the cache memory simply determines prefetch accuracy at the centralized memory. As a result, the more complex case becomes where prefetch accuracy and/or congestion bandwidth is to be determined in a physically and/or logically distributed cache, where units, modules, and logic are similarly distributed. Consequently, a majority of the following discussion—FIG. 2—focuses on specific exemplary embodiments of a distributed system to ferret out more issues regarding optimization of prefetch throttling. However, the flowing description may be similarly applied to any described cache organization.

Figure 2:
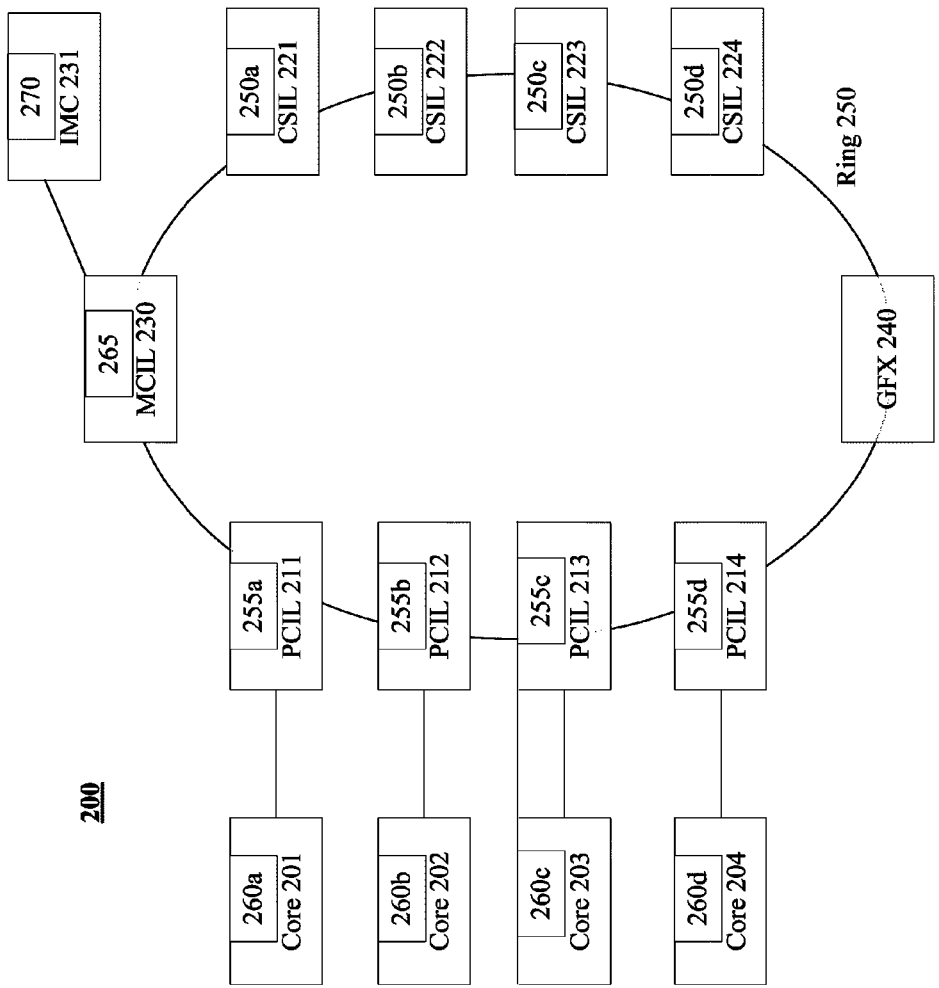
FIG. 2 illustrates an embodiment of prefetch throttling logic for multiple cores sharing access to a distributed cache.

Turning to FIG. 2, an embodiment of processor 200 including a physically distributed, shared cache and on-processor memory interface module—an uncore module—is illustrated. Continuing the discussion immediately above, processor 200 is illustrated including a physically distributed cache; a ring interconnect; as well as core, cache, and memory controller components. However, this depiction is purely illustrative, as a processor implementing the described methods and apparatus may include any processing elements, style or level of cache, and/or memory, front-side-bus or other interface to communicate with external devices.

In one embodiment, caching agents 221-224 are each to manage a slice of a physically distributed cache. As an example, each cache component, such as component 221, is to manage a slice of a cache for a collocated core—a core the cache agent is associated with for purpose of managing the distributed slice of the cache. As depicted, cache agents 221-224 are referred to as Cache Slice Interface Logic (CSIL)s; they may also be referred to as cache components, agents, or other known logic, units, or modules for interfacing with a cache or slice thereof. Note that the cache may be any level of cache; yet, for this exemplary embodiment, discussion focuses on a last-level cache (LLC) shared by cores 201-204. Much like cache agents handle traffic on ring interconnect 250 and interface with cache slices, core agents/components 211-214 are to handle traffic and interface with cores 201-204, respectively. As depicted, core agents 221-224 are referred to as Processor Core Interface Logic (PCIL)s; they may also be referred to as core components, agents, or other known logic, units, or modules for interfacing with a processing element Additionally, ring 250 is shown as including Memory Controller Interface Logic (MCIL) 230 and Graphics Hub (GFX) 240 to interface with other modules, such as memory controller (IMC) 231 and a graphics processor (not illustrated). However, ring 250 may include or omit any of the aforementioned modules, as well as include other known processor modules that are not illustrated. Additionally, similar modules may be connected through other known interconnects, such as a point-to-point interconnect or a multi-drop interconnect.

In one embodiment, processor 200 includes prefetch throttling logic to provide throttling levels and/or indicators. As a first example, prefetch throttling takes into account congestion at one or more points within processor 200 and/or interfaces associated therewith, as well as the accuracy/efficiency of prefetches. In one embodiment, prefetch throttling logic is physically unified or centralized—associated with a physically unified cache memory and capable of providing throttling indicators back to processing elements from the physically unified cache.

Alternatively, prefetch throttling logic may be physically distributed, as depicted in FIG. 2. As an example, prefetch throttling logic includes congestion module 265 and/or 270 to determine bandwidth congestion and prefetch accuracy modules 250a-d to determine prefetch accuracy. Here, a combination of the distributed modules determine a prefetch throttling level based on bandwidth congestion and prefetch efficiency; this level is then provided to one or more of core components 211-214. Modules 255a-d then provides an appropriate throttling level to cores 201-204, respectively. Cores 201-204 are each associated with prefetch generation logic 260a-d, each of which is capable of throttling the generation of prefetches based on a received prefetch throttling level. Therefore, prefetch throttling logic, in one embodiment, includes the bandwidth congestion logic and prefetch accuracy logic to determine and provide a prefetch throttling level. In an additional embodiment, prefetch throttling logic may also include the core component logic to receive prefetch throttling levels and to determine the appropriate prefetch level to forward to its associated core. And, in yet another embodiment, prefetch throttling logic may additionally include the actual prefetch generation and throttle logic within cores 201-204.

As referred to above, bandwidth congestion may be measured at various points within processor 200 or interconnects coupled thereto. Previously, prefetch throttling was only based on a queuing state within a core—herein referred to as on-core congestion, which is in contrast to bandwidth congestion. Therefore, in one embodiment, bandwidth congestion includes any known method for determining bandwidth usage and/or congestion at various points outside the prefetch generation queues, which typically reside within processor cores 201-204. A few examples of potential points for bandwidth congestion measurement include: a number of outstanding transactions in a memory interface; a number of outstanding transactions in a pipeline of an uncore; memory bandwidth utilization; a number of memory transactions in a memory queue, a number of open pages in a memory architecture, a number of busy pages in a memory architecture, a number of outstanding transactions in a memory interface pipeline, and a number of outstanding transactions in an uncore pipeline as tracked by a transaction counter associated with the uncore pipeline. Each of these examples may be taken at different states and/or periods of operation, such as measurement of congestion over a period of times/processor cycles. Note that this list is purely illustrative and is not meant to be all-encompassing. For example, if prefetching is being performed for a graphics intensive workload, then bandwidth congestion may be measured utilizing logic associated with graphics interface 240—the bandwidth congestion of a graphics interconnect or device attached thereto. Additionally, any combination of the aforementioned examples of congestion may be utilized or combined with other known congestion or bandwidth metrics.

As a specific illustrative example, a counter or queue depth of outstanding memory transactions held in a queue of MCIL 230 and/or IMC 231 is utilized as a bandwidth congestion indicator. In other words, outstanding transactions in a queue of the uncore—core components 211-214, cache components 221-224, and MCIL 230—indicates the congestion level. Here, when the counter or queue depth exceeds a high threshold, it's determined that the uncore is in a congested state. To add to this example, memory bandwidth module 231 may determine bandwidth congestion of a memory interface, such as an interface to DRAM through a number of busy pages, open pages, and/or actual interconnect utilization over a period of time. Similarly, when the congestion of the DRAM interface exceeds a high watermark, the DRAM interface is in a congested state. Based on the implementation, bandwidth congestion for prefetch throttling may utilize none, one, or both of these techniques. As a quick illustration, a congested state may be indicated by either uncore congestion exceeding a high threshold or DRAM congestion exceeding a high threshold. In this case, congestion is measured at multiple points, and the highest congestion state is utilized. Alternatively, the support for measuring at various points may be provided, but only a single congestion point may be utilized.

In one embodiment, a single congestion threshold value is utilized to delineate between a congested state and a non-congested state. Essentially, if congestion is over a threshold, a congested state exists. And conversely, if congestion is under the threshold, a non-congested state exists. Yet, in an alternative embodiment, it's advantageous to provide finer grained throttling. Here, bandwidth congestion includes multiple levels of congestion. Essentially, multiple thresholds or watermarks are utilized to delineate between the congestion states. For example, if two thresholds are used, then three congestion states exist: high congestion—above a high watermark; normal congestion—between a low watermark and the high watermark; and low congestion—below the low watermark.

In this case, different actions may be taken dependent on the congestion state. For example, if there is low congestion, then a no prefetch, or zero prefetch, throttle indicator is provided. In other words, if there is low congestion, there is no need to throttle prefetch generation. Additionally, a normal congestion level indicates that any current prefetch throttling, or lack thereof, is generating the right amount of traffic, so the current prefetch throttling level is maintained. In contrast, when there is a high congestion level, then a prefetch throttling level is provided.

Yet, in one embodiment, multiple prefetch throttling levels may be available for high congestion based on the prefetch accuracy/efficiency. As stated above, if there is a high amount of prefetches—high congestion—but the prefetches are efficient and being hit by subsequent demand requests, then reducing the prefetch generation may degrade performance. Alternatively, if the high number of prefetches are inefficient and not being hit, then more throttling may maintain performance, save power, and increase data locality. As a result, in one embodiment, a prefetch throttling level is determined and provided based on both congestion level and prefetch accuracy/efficiency.

Prefetch accuracy and/or efficiency may be determined in any known manner for evaluating prefetches. As an example, a miss rate, or alternatively a hit rate, is utilized to determine the accuracy and efficiency of prefetches. Essentially, if a data element is prefetched into a cache, such as a slice of a LLC managed by CSIL 221, then the accuracy of the prefetch is determined by whether any of cores 201-204 miss or hit the data element within the slice of the cache. If the data element from the prefetch is not hit until evicted out of the cache by a subsequent demand, then the prefetch is determined to be inaccurate or inefficient. Most often hit and/or miss rates are expressed as a percentage—number of hits/misses over a total number of measured accesses.

Note that hit or miss rates may be determined over a period of time, such as a number of processor cycles, or for a finite number of accesses. The hit or miss rates may be measured for demand reads, read for ownership transactions, and write-back evictions from upper level caches or some combination of these transactions including subsequent prefetches. As a result, the hit or miss rates may be measured for inclusive and/or exclusive cache hierarchies.

Figure 4:
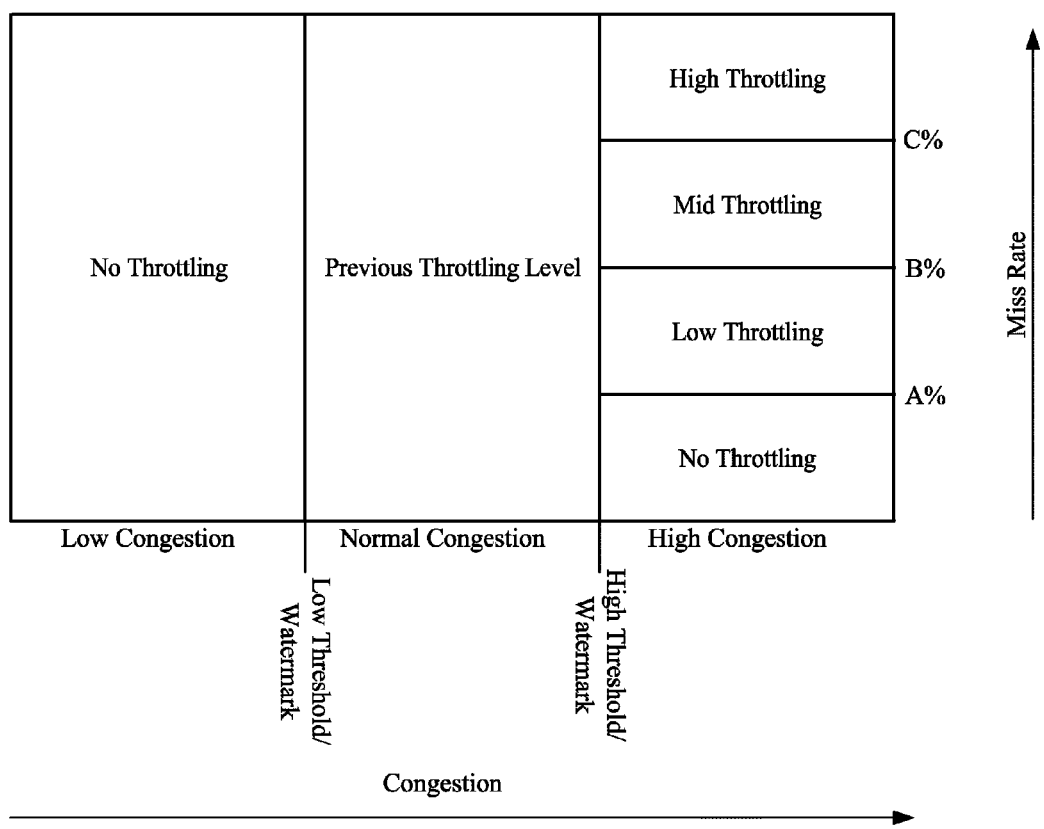
FIG. 4 illustrates an embodiment of a table to represent congestion and miss rate thresholds for determining a prefetch generation throttling level.

To illustrate an embodiment of utilizing congestion level and prefetch accuracy, a purely illustrative example is now proffered in regards to FIGS. 2 and 4. Over a period of time, which may be predetermined or dynamically adjustable, memory bandwidth logic 270 in IMC 231 determines a bandwidth utilization for memory, such as a DRAM. Remember from the discussion above that other bandwidth congestion may be measured in combination with, or in the alternative to, DRAM bandwidth, such as a number of outstanding transactions in queue 265 of MCIL 230. Referring to FIG. 4 and taking note of the congestion axis, if the congestion level is below the low threshold/watermark, then a low congestion state is determined. Here, a no, or zero, throttling level is provided to the appropriate PCILs.

In one embodiment, the congestion logic, such as logic 265 or 270, performs the threshold comparison and directly provides the indicator of a low congestion state, which represents no throttling, to the appropriate PCIL. Alternatively, logic 265 and 270 may only perform the congestion measurement and/or the threshold comparison and provide its results to CSIL's 221-224. CSIL's 221-224 may then either perform the threshold comparison and/or provide the zero throttling level to the appropriate PCIL. Similarly, if the congestion level is between the low threshold/watermark and the high threshold/watermark, indicating a normal congestion level, then no congestion indicator is provided. Alternatively, a previous or maintain throttling level may be provided to indicate that the previous throttling level is to be maintained.

However, if the congestion is above the high threshold/watermark, then a high congestion level is indicated. To continue the example, assume that logic 265 determines a high congestion level and sends a high congestion level indicator to CSIL's 221-224. As a result, a CSIL, such as CSIL 221, includes prefetch accuracy logic 250a to determine a prefetch accuracy, such as a miss rate. As an aside, note that each of CSIL's 221-224 may perform similar prefetch accuracy measurements. In one embodiment, prefetch accuracy measurement may be performed in the same time period/interval as the measurement of the congestion level described above. An exemplary range of a time interval includes 5 processor cycles to 100,000 processor cycles. As a specific illustrative embodiment, which has been shown to be advantageous through simulation, the measurement interval includes 20,000 cycles. However, the time interval for measuring prefetch accuracy may instead partially overlap or be completely disjoint from the congestion level interval based on processor design.

In one embodiment, logic 250a measures prefetch accuracy, such as miss rate, observed at its collocated slice—the slice of a cache that CSIL 221 is responsible for managing—for traffic sourced from all cores 201-204. In other words, logic 250a keeps track of a miss rate for each of cores 201-204. In another embodiment, CSIL 221 only measures a miss rate for traffic sourced for its collocated core 201—the core CSIL 221 is associated with and managing the distributed cache slice for. In the later case, the assumption is that the hash algorithm evenly distributes traffic from each core to all cache slices, such that CSIL's are able to only track miss rates to their collocated slice, which are sourced from their collocated core.

Assuming both the congestion level and miss rate are measured in the same interval, then when CSIL 221 receives a high congestion indicator from MCIL 230, it compares the measured miss rate to a plurality of miss rate thresholds to determine the correct prefetch throttling level. Note that in the case where CSIL 221 only tracks a miss rate for traffic from core 201, then this comparison is only done for the single miss rate. Alternatively, if miss rates are tracked for each of cores 201-204 at CSIL 221, then the comparison is done for the four separate miss rates corresponding to the four cores 201-204.

Turning back to FIG. 4, an exemplary embodiment of different prefetch throttling levels, as defined by miss rate thresholds/watermarks, within a high congestion state are illustrated. Here, if the miss rate is below A %, then no, or zero, throttling is provided; if the miss rate is between A % and B %, then low throttling is provided; if the miss rate is between B % and C %, then mid throttling is provided; and if the miss rate is above C %, then high throttling is provided. Essentially, as the miss rate increases—the efficiency of prefetching decreases—it's more advantageous to increase the throttling level because the prefetches are not being utilized. Conversely, if hit rate is utilized, then as the hit rate increases—the efficiency of prefetching is increasing—it's more advantageous to decrease throttling, since the prefetches are being utilized.

As an example, the miss rate thresholds may be 40%, 60%, and 80% for A %, B %, and C %, respectively; however, any threshold values may be utilized and any number of threshold values may also be used. Note from FIG. 4, that N miss rate threshold values are given, which enables N+1 prefetch throttling states. Additionally, M congestion thresholds are illustrated, which enables M+1 congestion states. In addition, to tune prefetch throttling during operation, the threshold values may be given a default value, but may be dynamically adjustable to ensure the best granularity for throttling level based on congestion level and prefetch accuracy. Similarly, the congestion thresholds may also be dynamically adjustable or predetermined.

Once CSIL 221 has determined the correct prefetch throttling level based on congestion level and prefetch miss rate/accuracy, the appropriate throttling level is provided/transmitted to the appropriate core. In the embodiment where CSIL 221 only measures a miss rate for traffic sourced from core 201, CSIL 221 only transmits the determined throttling level to PCIL 211 for core 201. This is the most simple case, where a few design assumptions allow for CSILs to track prefetch accuracy for a single collocated core. As a result, PCILs only receive single throttling updates per interval and forward them to their associated core.

However, in the other embodiment, where each of CSILs 221-224 track miss rates to their associated slices for traffic sourced from all cores 201-204, a more complex protocol may be involved. As an example, CSIL 221 determines a throttling level for all four miss rates that correspond to cores 201-204. After determining the throttling levels, CSIL 221 transmits the throttling levels on ring 250 to the corresponding PCIL's 211-214. Consequently, each PCIL, such as PCIL 211, may receive as many as four throttling levels—one from each of CSILs 221-224—and each of them may be a different throttling level. In one embodiment, to ensure a core is not monopolizing a cache slice, the highest throttling level of the received levels is utilized. For example, if PCIL 211 receives four throttling levels—no, low, mid, and high—from the four CSILs 221-224, then logic 255a selects the highest throttling level—high throttling—and provides it to core 201. Other throttling level selection algorithms may be utilized, such as an average of the received levels or the lowest of received levels.

As stated above, the examples described are in reference to a shared, distributed cache with the illustrated memory interface logic on processor 200. However, in the case of a centralized LLC, as shown in FIG. 1, the examples become much simpler. Here, a congestion condition is similarly reported, but the miss rate for each core is determined at the centralized cache. The same prefetch level determination is made and then individually provided to each of the cores from the centralized LLC.

Figure 5:
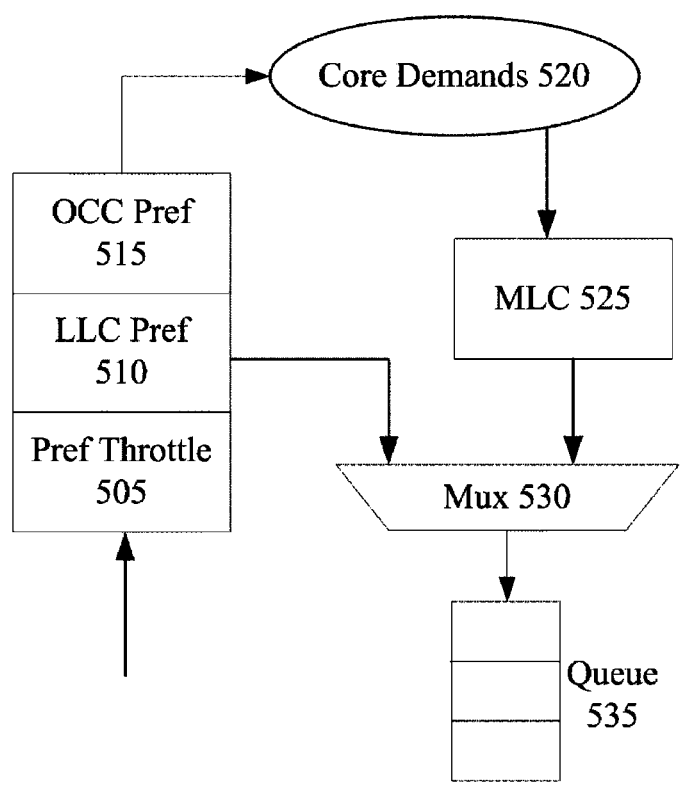
FIG. 5 illustrates an embodiment of prefetch generation and throttling logic within a core.

Either way, when a core receives a prefetch throttling level, it throttles the prefetch generation accordingly. Quickly referencing FIG. 5, an exemplary embodiment of core prefetch generation logic is illustrated. Here, decisions for generating on-core cache (OCC), such as a prefetch into a low-level data cache, and last level cache (LLC), such as a second or third level cache shared by multiple cores, is made in the core. Alternatively, the OCC and LCC prefetchers, 510 and 515, may be physically separated, where the OCC prefetcher 515 is in the core and the LLC prefetcher 510 is close to the LLC pipeline; such an arrangement would include two prefetch generating components to coordinate their prefetch generation for best performance. Previously, prefetch throttling was purely determined based on some direct or indirect measure of the depth of queue 535 for outstanding prefetches associated with the core. However, the described apparatus' and methods may be utilized with prefetchers for different level caches whether they physically reside together within the core, as illustrated, or separately. Essentially, in FIG. 5, instead of the depth of Queue 535 feeding back into prefetch throttle 505, the prefetch throttle level determined, as described above, is provided to the prefetch throttle logic 505. This logic in turn throttles prefetch generation at the appropriate cache level.

Figure 3:
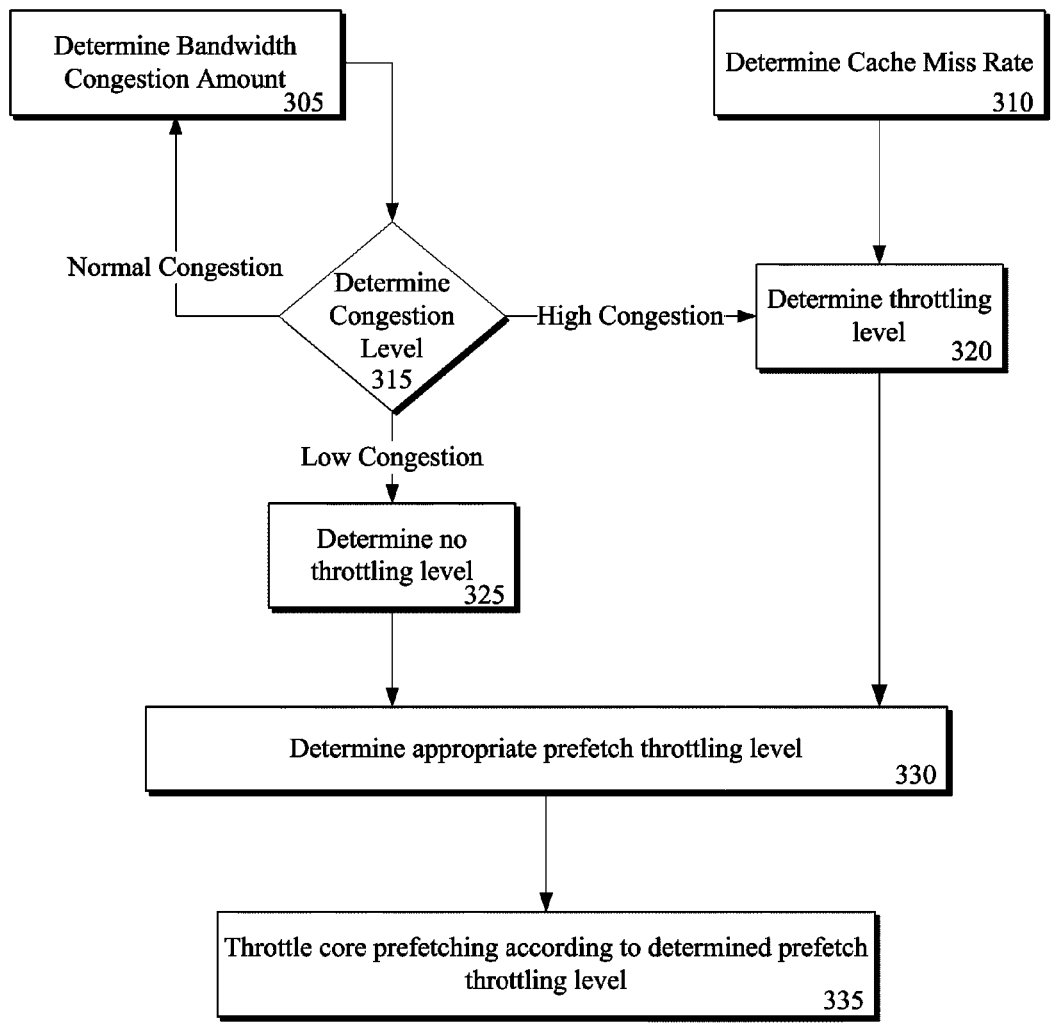
FIG. 3 illustrates an embodiment of a flow diagram for a method of throttling prefetch generation based on congestion level and cache miss rate.

Turning next to FIG. 3, an embodiment of a method for optimizing prefetching is depicted. Although the flows of FIG. 3 are illustrated in a substantially serial fashion, each of the flows may be performed at least partially in parallel or in a different order. Furthermore, some of the illustrated flows may be omitted, while other flows may be included in different embodiments.

Starting at flow 305, a bandwidth congestion amount is determined. Any of the aforementioned metrics for bandwidth and/or congestion, as well as any known metric for bandwidth and/or congestion may be utilized for flow 305. As a first example, a number of outstanding transactions in a memory interface, such as uncore, may be measured for bandwidth congestion. Here, a counter and/or depth of a queue in logic, such as a controller hub or agent therefore, is utilized to measure a number of outstanding transactions. As a second example, bandwidth of the memory interface itself is measured, such as bandwidth utilization of a system memory interconnect. Here, a memory controller hub or other logic associated with the memory interface may be used to determine the bandwidth utilization.

In flow 310 a prefetch accuracy is determined. In one embodiment, a prefetch accuracy includes a miss rate. As described above, the miss rate may be tracked by an agent for each core or for a specific, collocated core. As an example, the miss rate is determined in the same period/interval that the bandwidth congestion amount is determined in flow 305.

In flow 315, the congestion level is determined. In one embodiment, the memory controller, or other modules associated with measuring the bandwidth congestion amount, compares the bandwidth congestion amount to congestion thresholds; this comparison allows for determination of the congestion level. From the specific example given above with two threshold levels, a low, medium, or high congestion level may be determined. If a normal or medium congestion level is determined from the measured bandwidth congestion amount, then in one embodiment no throttling signal is provided; the flow returns to flow 305 where the process repeats during the next interval. In contrast, if the bandwidth congestion amount is below the low watermark, then a no, or zero, throttling level is determined in flow 325.

Alternatively, if the bandwidth congestion amount is above a high watermark, then a high congestion level is determined. In one example, a high congestion indicator is sent to an agent, such as CSILs described above. And, in flow 320, the throttling level is determined based on the measured cache miss rate. As stated above, the miss rate may be compared to N threshold/watermark values to determine one of N+1 prefetch throttling states/levels. Specifically, the example above describes three threshold values and four throttling states—no, low, mid, and high throttling.

Once an agent, such as a CSIL, determines the throttling level in flow 320, or no throttling level is determined in flow 325 due to the bandwidth congestion amount being below a specified congestion threshold, then the prefetch throttling level is provided to the appropriate core. As referenced above, in the case where a core only receives a single throttling level per interval, then flow 330 becomes a simple forward to flow 335, where the core receives the throttling level and throttles accordingly. However, in the scenario where a core receives multiple throttling levels, such as a throttling level from each CSIL for each slice of a cache, the PCIL or core determines the appropriate throttling level in flow 330. In one embodiment, the appropriate throttling level is the highest received throttling level. However, any algorithm for selecting between multiple throttling levels may be used. Once again, when the appropriate level is determined, then in flow 335, the core throttles the prefetch generation, accordingly. Note from the discussion of FIG. 5 above that, if the cache monitored for prefetch accuracy is a low-level cache within the core, an OCC prefetcher may be throttled. Similarly, if the cache is a high-level, last-level cache, then an LLC prefetcher may be throttled whether the LLC prefetcher is physically located close to the core or close to the cache pipeline. Additionally, multiple prefetch generators may be throttled based on a single received prefetch throttling level.

The apparatus and methods described herein for optimization to prefetch throttling, which potentially enhances performance, reduces power consumption, and maintains positive gain for workloads that benefit from prefetching. More specifically, the optimizations described herein allow for bandwidth congestion and prefetch accuracy to be taken into account as feedbacks for throttling at the source of prefetch generation. As a result, when there is low congestion, full prefetch generation is allowed, even if the prefetch is inaccurate, since there is available bandwidth. However, when congestion is high, the determination of throttling falls to prefetch accuracy. If accuracy is high—miss rate is low—then less throttling is needed, because the prefetches are being utilized—performance is being enhanced. Yet, if prefetch accuracy is low—miss rate is high—then more prefetch throttling is needed to save power, because the prefetch are not being utilized—performance is not being enhanced by the large number of prefetches.

A module as used herein refers to any hardware, software, firmware, or a combination thereof. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices. However, in another embodiment, logic also includes software or code integrated with hardware, such as firmware or micro-code.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible or machine readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical storage device, optical storage devices, acoustical storage devices or other form of propagated signal (e.g., carrier waves, infrared signals, digital signals) storage device; etc. For example, a machine may access a storage device through receiving a propagated signal, such as a carrier wave, from a medium capable of holding the information to be transmitted on the propagated signal.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
   a plurality of processor cores; and
   prefetch throttling logic associated with a processor core of the plurality of processor cores, the prefetch throttling logic to provide a prefetch throttling level to the processor core of the plurality of cores based on a bandwidth congestion and a prefetch accuracy.

2. The apparatus of claim 1, wherein the bandwidth congestion includes a number of outstanding transactions in a memory interface over a period of time.

3. The apparatus of claim 2, wherein the memory interface includes an uncore interface included on a physical processor having the plurality of processor cores, and wherein the number of outstanding transactions in the uncore interface includes the number of outstanding transactions to be held in a pipeline of the uncore interface.

4. The apparatus of claim 2, wherein prefetch accuracy includes a miss rate of at least the processor core to a cache associated with the processor core over the period of time, and wherein the prefetch logic includes miss rate logic to determine the miss rate over the period of time.

5. The apparatus of claim 4, wherein the miss rate of at least the processor core to the cache over the period of time includes a number of misses counted over the period of time in response to transactions or combination of transactions selected from a group consisting of demand reads, reads for ownership, and write-back evictions.

6. The apparatus of claim 4, wherein the miss rate logic is also to determine a miss rate for each of the plurality of processor cores.

7. The apparatus of claim 4, wherein the prefetch throttling logic to provide a prefetch throttling level to the processor core of the plurality of cores based on a number of outstanding transactions in an uncore pipeline and a miss rate of at least the processor core to a cache associated with the processor core over the period of time comprises:
   threshold logic to determine if the number of outstanding transactions in the uncore pipeline is greater than a high threshold;
   level logic to determine the prefetch throttling level from a plurality of predefined prefetch throttling levels based on the miss rate in response to the threshold logic determining the number of outstanding transactions is greater than the high threshold; and
   transmit logic to provide the prefetch throttling level to the processor core.

8. The apparatus of claim 7, wherein the threshold logic is also to determine if the number of outstanding transactions is below a low threshold, the level logic is to determine a no prefetch throttling level in response to the threshold logic determining the number of outstanding transaction is below the low threshold and the transmit logic to provide the no prefetch throttling level to the processor core in response to the level logic determining the no prefetch throttling level.

9. The apparatus of claim 8, wherein the threshold logic is also to determine if the number of outstanding transactions is between the low threshold and the high threshold, and wherein the transmit logic is to not provide a prefetch throttling level in response to the threshold logic determining the number of outstanding transactions is between the low threshold and the high watermark threshold.

10. The apparatus of claim 8, wherein the high threshold and the low threshold are dynamically adjustable.

11. The apparatus of claim 10, wherein the high threshold, the low watermark threshold, and the period of time are also dynamically adjustable.

12. The apparatus of claim 7, wherein the prefetch throttling logic further comprises a cache component to manage a slice of the cache associated with the processor core, the cache component to include the miss rate logic, the threshold logic, the level logic and the transmit logic, wherein the cache component is to be coupled through a ring interconnect to a core component.

13. The apparatus of claim 12, wherein the transmit logic to provide a prefetch throttling level to the processor core comprises the transmit logic to provide the prefetch throttling level to the core component through the ring interconnect, and the core component to provide the prefetch throttling level to the processor core in response to the prefetch throttling level being a highest throttling level of a plurality of throttling levels received at the core component.

14. The apparatus of claim 13, wherein a memory component to be associated with a memory controller, is to be coupled through the ring interconnect to the core component and the cache component, and wherein the memory component is to measure the number of outstanding transactions in the memory interface over the period of time.

15. The apparatus of claim 1, wherein the bandwidth congestion includes an amount of memory bandwidth utilization over the period of time.

16. An apparatus comprising: a processor including,
a cache memory;
a plurality of processing elements;
memory controller logic coupled to the plurality of processing elements, the memory controller logic to hold a representation of outstanding transactions associated with the plurality of processing elements;
congestion logic coupled to the memory controller logic to indicate a congested state in response to a number of outstanding transactions being greater than a congestion threshold; and
throttling logic coupled to the congestion logic to provide a throttling indicator to at least one processing element of the plurality of processing elements in response to the congested state.

17. The apparatus of claim 16, wherein the throttling indicator includes a prefetch throttling level, and wherein the prefetch throttling level is one of a plurality of prefetch throttling levels to be selected by the throttling logic based on a miss rate to the cache memory.

18. The apparatus of claim 17, wherein the cache memory includes a centralized cache memory to be shared by the plurality of processing elements, and wherein miss rate logic associated with the centralized cache memory is track miss rates to the cache memory for each of the plurality of processing elements.

19. The apparatus of claim 17, wherein the cache memory is to be distributed into a plurality of slices and to be shared by the plurality of processing elements, and wherein a cache agent to manage a slice of the cache memory associated with the at least one processing element of the plurality of processing elements is to track the miss rate to the slice of the cache memory for the at least one processing element.

20. The apparatus of claim 19, wherein the cache agent is also to track miss rates for the other processing elements of the plurality of processing elements to the slice of the cache memory.

21. The apparatus of claim 19, wherein the cache agent is coupled through a ring interconnect to a memory controller agent including the congestion logic and a processing element agent associated with the at least one processing element, and wherein the cache agent includes the throttling logic, the throttling logic to provide the prefetch throttling level to the at least one processing element comprises the throttling logic to provide the prefetch throttling level to the processing element agent and the processing element agent to provide the prefetch throttling level to the at least one processing element in response to the prefetch throttling level being a highest throttling level of a plurality of throttling levels received by the processing element agent.

22. A processor comprising:
a plurality of processor cores;
bandwidth congestion logic to determine a memory bandwidth congestion amount;
prefetch accuracy logic associated with a processor core of the plurality of processor cores to determine a prefetch accuracy; and
throttling logic to provide a throttling level of a number of throttling levels to the processor core based on the bandwidth congestion amount and the prefetch accuracy, wherein the number of throttling levels is greater than two.

23. The apparatus of claim 22, wherein the memory bandwidth congestion amount includes an amount selected from a group consisted of a number of memory transactions in a memory queue, a number of open pages in a memory architecture, a number of busy pages in a memory architecture, a number of outstanding transactions in a memory interface pipeline, and a number of outstanding transactions in an uncore pipeline as tracked by a transaction counter associated with the uncore pipeline.

24. The apparatus of claim 22, further comprising a centralized cache memory to be shared by the plurality of cores, wherein the prefetch accuracy logic to determine a prefetch accuracy comprises the prefetch accuracy logic to measure a miss rate to the centralized cache memory for each of the processor cores.

25. The apparatus of claim 22, further comprising a distributed cache memory to be shared by the plurality of cores, wherein the prefetch accuracy logic is to be associated with a slice of the distributed cache memory.

26. The apparatus of claim 25, wherein the prefetch accuracy logic to determine a prefetch accuracy comprises the prefetch accuracy logic to measure a miss rate to the slice of the distributed cache memory for only the processor core of the plurality of cores.

27. The apparatus of claim 25, wherein the prefetch accuracy logic to determine a prefetch accuracy comprises the prefetch accuracy logic to measure a miss rate to the slice of the distributed cache memory for each of the processor cores.

28. The apparatus of claim 25, wherein the bandwidth congestion logic is to be included in a memory controller agent, and wherein the prefetch accuracy logic and the throttling logic is to be included in a cache agent to manage the slice of the distributed cache memory.

29. The apparatus of claim 28, wherein throttling logic to provide a throttling level of a number of throttling levels to the processor core based on the bandwidth congestion amount and the prefetch accuracy comprises
the bandwidth congestion logic to provide a congestion indicator to the throttling logic in response to the memory bandwidth congestion amount being greater than a high congestion threshold;
the throttling logic to determine the throttling level of the number of throttling levels based on a plurality of prefetch accuracy thresholds; and
the throttling logic to provide the throttling level to a core agent associated with the processor core and coupled through an interconnect to the cache agent; and
the core agent to provide the throttling level to the processor core.

30. The apparatus of claim 29, further comprising storage to hold the plurality of prefetch accuracy thresholds as predefined threshold values.

31. A method comprising:
determining a congestion bandwidth amount;
determining a prefetch accuracy;
determining if the congestion bandwidth amount is greater than a high congestion bandwidth threshold;
determining a prefetch throttling level of a number of throttling levels based on the prefetch accuracy in comparison to a plurality of throttling level prefetch thresholds in response to determining the congestion bandwidth amount is greater than the high congestion bandwidth threshold;

determining if the congestion bandwidth amount is less than a low congestion bandwidth threshold;

determining there is to be no prefetch throttling in response to determining the congestion bandwidth amounts is less than the low congestion bandwidth threshold;

determining if the congestion bandwidth amount is between the high congestion bandwidth threshold and the low congestion bandwidth threshold; and determining there is to be no update to a current prefetch throttling level in response to determining the congestion bandwidth amount is between the high congestion bandwidth threshold and the low congestion bandwidth threshold.

32. The method of claim 31, wherein a congestion bandwidth amount includes an amount selected from a group consisted of a number of memory transactions in a memory queue, a number of open pages in a memory architecture, a number of busy pages in a memory architecture, a number of outstanding transactions in a memory interface pipeline, and a number of outstanding transactions in an uncore pipeline as tracked by a transaction counter associated with the uncore pipeline.

33. The method of claim 31, wherein the high bandwidth congestion level and the low bandwidth congestion level are each dynamically adjustable.

34. The method of claim 31, wherein the prefetch accuracy includes a miss rate of a processor core to a cache shared by a plurality of processor cores, and wherein the prefetch throttling level is a percentage of a full prefetch rate.

35. A system comprising:
a memory to hold data; and
a processor coupled to the memory through an interconnect, the processor including uncore logic to interface with the memory through the interconnect and prefetch throttling logic coupled to a processor core of a plurality of processor cores, the prefetch throttling logic to provide a prefetch throttling level of a number of prefetch throttling levels to the processor core based on bandwidth congestion associated with transactions to access data to be held in the memory and prefetch accuracy of the data from the memory, wherein the number of prefetch throttling levels is greater than two.

36. The system of claim 35, wherein the uncore logic includes a memory controller agent to interface with the memory through the interconnect, a cache agent to interface with a cache memory to be shared by the plurality of processor cores, and a core agent to interface with a processor core of the plurality of processor cores, and wherein the memory controller agent, the cache agent, and the core agent are to be coupled together in a ring.

37. The system of claim 36, wherein the bandwidth congestion associated with transactions to access data to be held in the memory includes a number of outstanding transactions in a pipeline of the uncore logic, and wherein the prefetch accuracy of the data from memory includes a miss rate of the processor core to the cache memory.

38. The system of claim 37, the prefetch throttling logic to provide a prefetch throttling level of a number of prefetch throttling levels to the processor core based on the number of outstanding transactions in the pipeline of the uncore logic and a miss rate of the processor core to the cache memory comprises: the prefetch throttling logic to determine if the number of outstanding transactions in the pipeline of the uncore logic is greater than a high congestion threshold of outstanding transactions;

determine the prefetch throttling level from the number of prefetch throttling based on the miss rate of the processor core to the cache memory in comparison to a plurality of miss rate accuracy thresholds in response to determining the number of outstanding transactions in the pipeline of the uncore logic is greater than the high congestion threshold of outstanding transactions; and provide the prefetch throttling level from the cache agent to the processor core through the core agent.

* * * * *